Oct. 17, 1950 — G. J. WILSON — 2,526,311
POROUS BODY
Filed Sept. 24, 1943
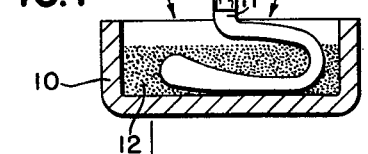
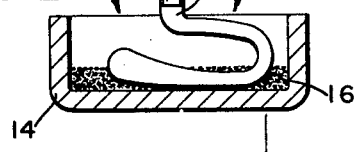
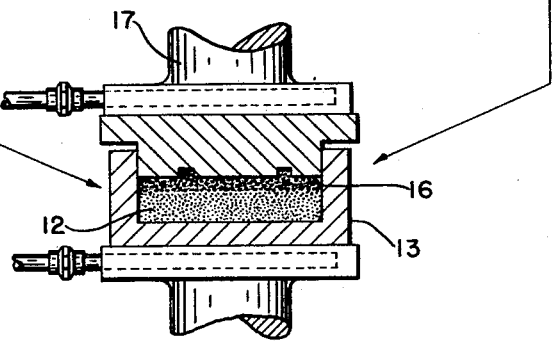
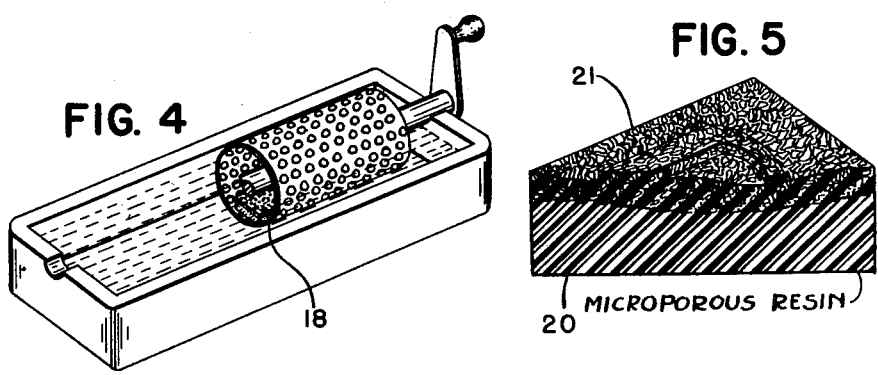
Inventor
GALEN J. WILSON
BY Carl Beust
HIS Attorney Patented Oct. 17, 1950

2,526,311

UNITED STATES PATENT OFFICE 2,526,311

POROUS BODY

Galen J. Wilson, Dayton, Ohio, assignor to The National Cash Register Company, Dayton, Ohio, a corporation of Maryland Application September 24, 1943, Serial No. 503,597

5 Claims. (Cl. 154—43)

This invention relates to laminated molded objects having interconnected pores in and between laminations and at least one layer of which is a porous resilient rubber or rubber-like substance and another layer of which is a porous rigid material acting as a support for the resilient layer.

The invention is particularly adapted for use in the printing art wherein the entire laminate porous body holds an ink supply as a continuous phase, one layer of the body being resilient to facilitate in making a printing impression and the other layer acting as a non-resilient backing.

The laminate layers are molded from separate mixtures of granular substances including filler material, which mixtures are molded and bonded together. Thereafter the filler is leached out to form microscopic interconnecting pores.

The invention will be disclosed herein with the resilient portion of the laminate body made of synthetic rubber and the rigid portion of the body made of a phenol formaldehyde resin. The invention is not to be deemed limited, however, by the number of laminations, their relative thickness and shape, or by the particular materials selected for forming the laminations.

The principal object of the invention is to provide a unitary laminate body having layers of resilient and rigid material in which are incorporated microscopic interconnecting pores making the entire body continuously permeable.

Of the drawings in connection with which a preferred embodiment of the invention will be disclosed, Fig. 1 shows the mixing of the ingredients used in making the rigid layer.

Fig. 2 shows the mixing of the ingredients used in making the resilient layer.

Fig. 3 shows the molding and curing step.

Fig. 4 shows a method of leaching the filler.

Fig. 5 shows an enlarged fragment of the completed object.

General description

Approximately twenty-five per cent., by weight, of granular uncured phenol-formaldehyde resin is intermingled with approximately seventy-five per cent., by weight, of granular sodium nitrate, in a container 10 (Fig. 1) by a stirring means 11. The grain size preferably is such as to pass a screen of one hundred mesh to the inch, although the grain size may range between that which will pass a twenty-five mesh to the inch screen and that which will pass a three hundred twenty-five mesh to the inch screen. The intermingled granules 12 (Figs. 1 and 3) are placed in a layer in the bottom of a pressure-heat molding die 13. This layer will, when cured, form the rigid lamination of the unitary body.

Granular synthetic rubber, preferably of the butadiene copolymer class, if the molded object is for use with inks, is intermingled with granular sodium nitrate in a container 14 (Fig. 2) by stirring means 15. The rubber preferably should constitute approximately twenty-five per cent. of the mixture 16 (Figs. 2 and 3) by weight, and the sodium nitrate should constitute approximately seventy-five per cent. of the said mixture 16 by weight. The size of the rubber granules is preferably that which will pass a screen having twenty-five mesh to the inch, or smaller, and the sodium nitrate granules preferably should pass a screen of three hundred twenty-five mesh to the inch, although these grain sizes may be chosen between those passing a twenty-five mesh to the inch screen and those passing a three hundred twenty-five mesh to the inch screen. The rubber mixture 16 is placed in molding die 13 (Fig. 3) in a layer on top of layer 12.

The proportion of the filler sodium nitrate which has been specified is rather critical for obtaining the most uniformly porous laminate structure. In the use of other fillers than sodium nitrate, the amount used, while it might not constitute seventy-five per cent. of the mix by weight, because of different density, should be that amount which assures that the granules of the filler have contact throughout the product as it comes from the mold, so as to enable total removal of the filler by leaching, as any filler granules entirely surrounded by unleachable material would be trapped. Also, other filler substances should be such that they or their leaching agents be inert as to the rubber and the phenol-formaldehyde resin, or other substances which may be used in their place.

The necessary molding pressures and curing temperatures are shown as being supplied by a steam-heated press 17. Other suitable equivalent means may be used. It is apparent that, in choosing materials other than those disclosed as an example, the rigid backing material must be settable at temperatures within the range suitable for curing the rubber and must adhere thereto.

The cured product 18 (Fig. 4) is placed in a suitable leaching bath, in this example hot water, which dissolves the filler and leaches it from the molded body.

Fig. 5 shows an enlarged fragment of the final molded product having a rigid layer 20 and a resilient layer 21, the pores in each layer being interconnected and the pores of the two layers being interconnected to render the molded product wholly permeable by a continuous porous network.

While the product made in accordance with the specification is admirably adapted to fulfill the objects primarily stated, it is to be understood that the invention is directed particularly to the laminated structure having a continuous porous phase. It is not intended to confine the invention to the preferred form of embodiment herein disclosed, for it is susceptible of embodiment in various forms by varying ingredients and processing steps, all coming within the scope of the claims which follow.

What is claimed is:

1. A molded laminate continuous unitary body having a resilient rubber layer and a phenol formaldehyde resin layer, and having interconnecting pores throughout the body in and between layers.

2. A molded laminate continuous unitary body having a resilient rubber layer and a phenol formaldehyde resin layer, and having interconnecting microscopic pores throughout the body in and between layers.

3. A molded laminate continuous unitary body having a layer of resilient vulcanized rubber and an adjacent layer of a cured phenol formaldehyde resin, said body having microscopic interconnecting pores throughout the body in and between layers.

4. A molded continuous unitary body including a layer of resilient butadiene copolymer and a layer of hard phenol formaldehyde resin, said body having interconnecting microscopic pores throughout the body in and between layers.

5. A molded continuous unitary body including a layer of resilient vulcanized butadiene copolymer and a layer of cured hard phenol formaldehyde resin, said body having interconnecting microscopic pores throughout the body in and between layers.

GALEN J. WILSON.

REFERENCES CITED

The following references are of record in the file of this patent:

UNITED STATES PATENTS

| Number | Name | Date |
|---|---|---|
| 978,689 | Busby | Dec. 13, 1910 |
| 1,352,739 | Egerton | Sept. 14, 1920 |
| 1,431,471 | Lehr | Oct. 10, 1922 |
| 1,843,893 | Becher | Feb. 2, 1932 |
| 1,908,747 | Girg | May 16, 1933 |
| 1,930,441 | Miller | Oct. 10, 1933 |
| 1,960,137 | Brown | May 22, 1934 |
| 2,007,588 | Wescott | July 9, 1935 |
| 2,043,954 | Kershaw | June 9, 1936 |
| 2,175,798 | Hauser | Oct. 10, 1939 |
| 2,180,304 | Minor | Nov. 14, 1939 |
| 2,194,569 | Rumpf | Mar. 26, 1940 |
| 2,323,936 | Roberts | July 13, 1943 |
| 2,349,613 | Chollar | May 23, 1944 |

FOREIGN PATENTS

| Number | Country | Date |
|---|---|---|
| 406,286 | Great Britain | Feb. 15, 1934 |